Figure 1:
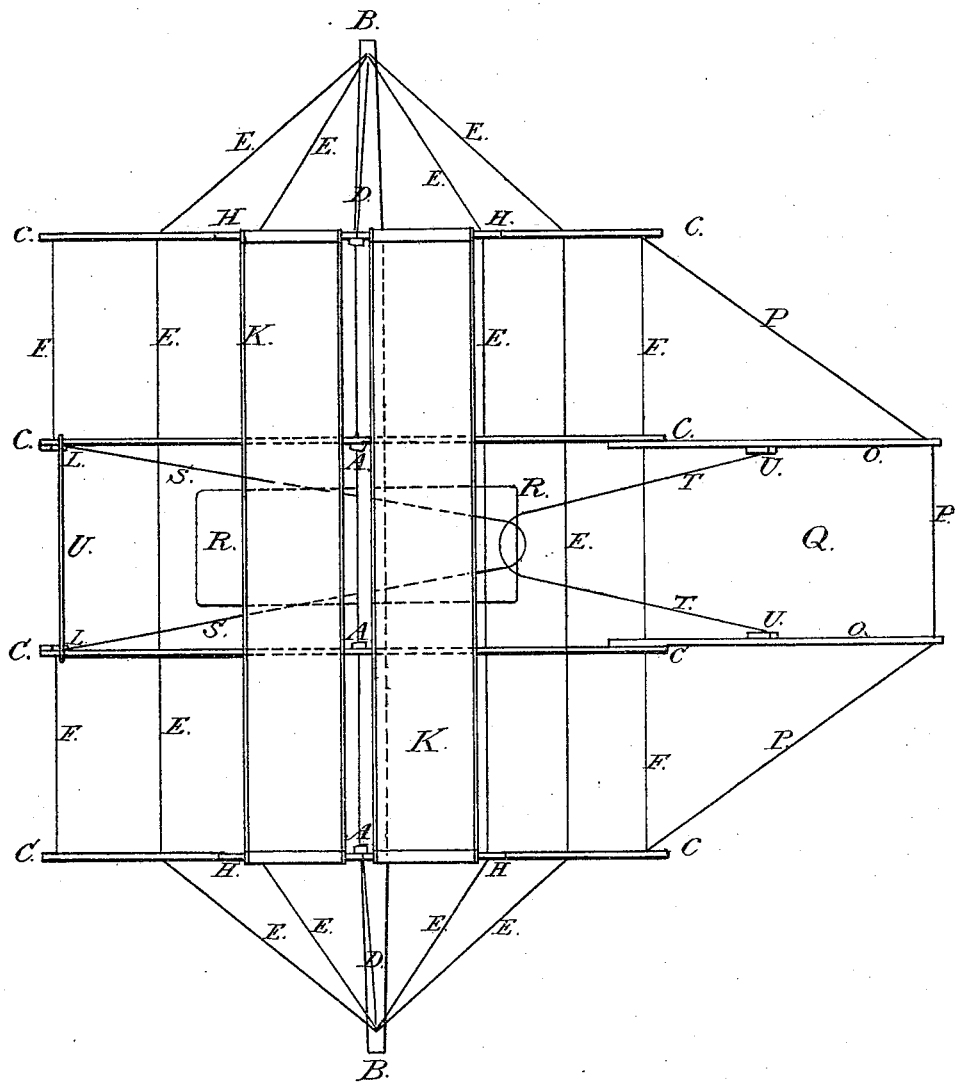

3 Sheets--Sheet 1.

C. McDERMOTT.
Improvement in Apparatus for Navigating the Air.

No. 133,046.    Patented Nov. 12, 1872.

Witnesses
John R. Young
Thomas C. Smith

Inventor
Chas. McDermott, by
Prindle and Co., his attys.

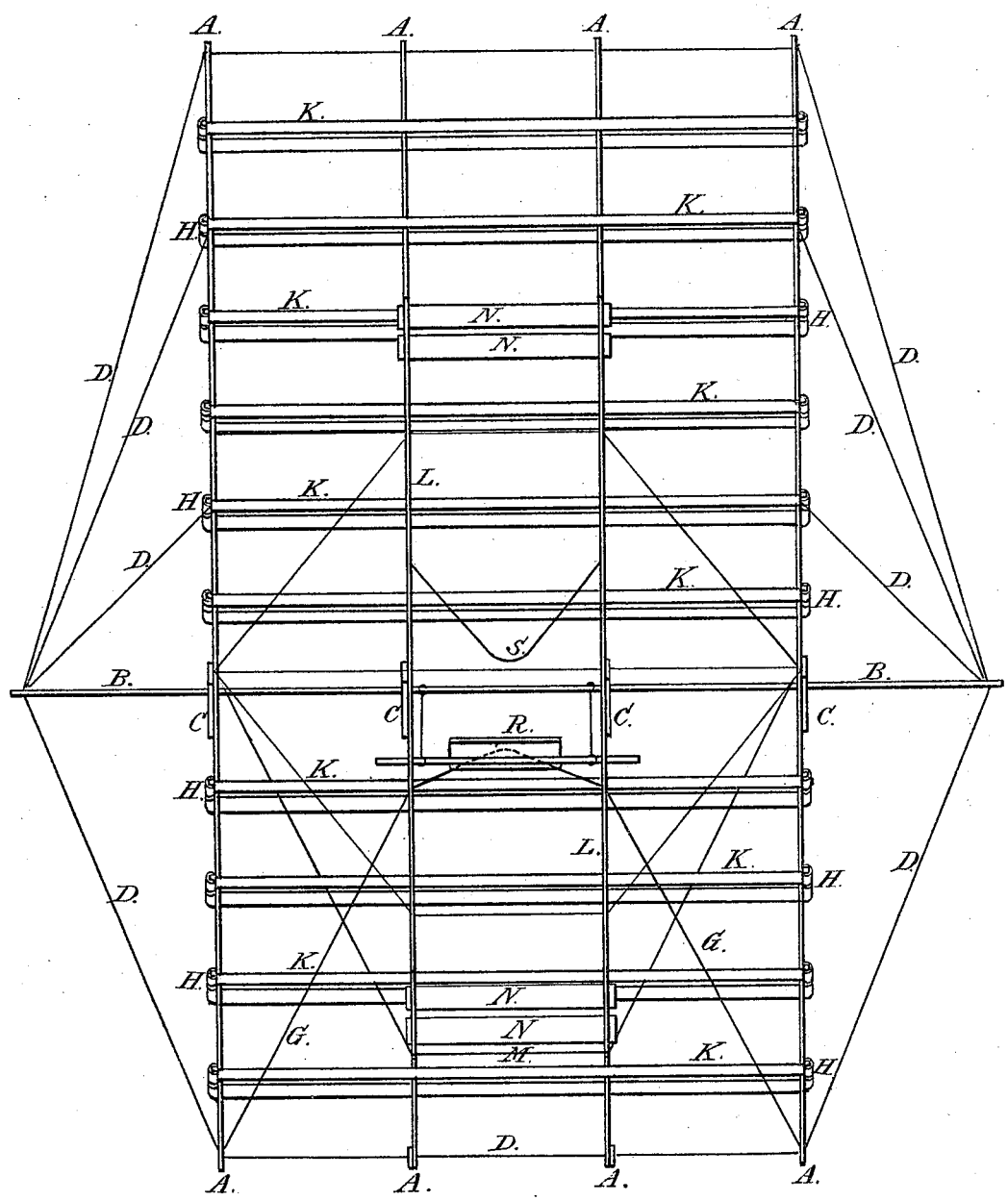

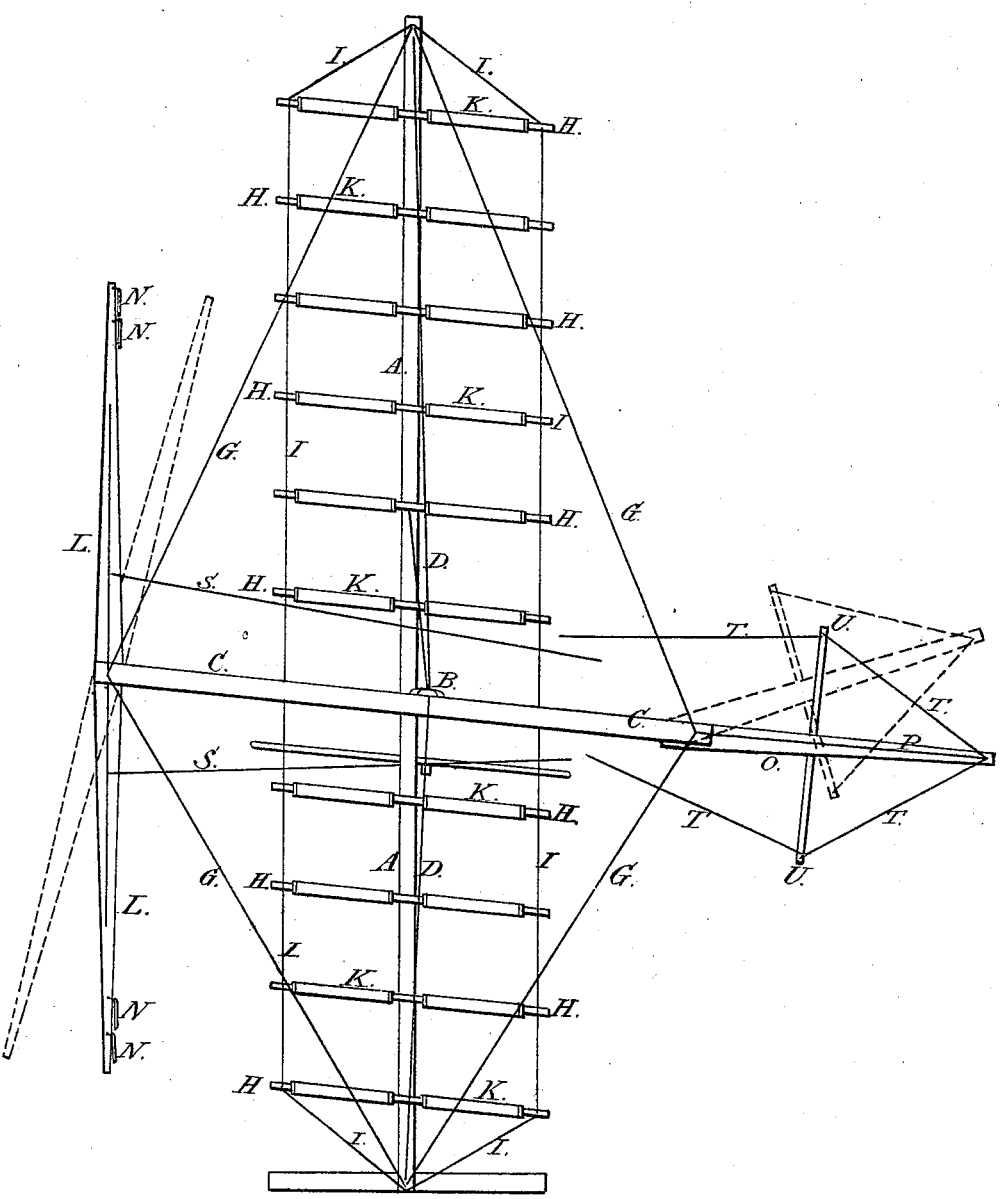

UNITED STATES PATENT OFFICE.

CHARLES McDERMOTT, OF MONTICELLO, ARKANSAS.

IMPROVEMENT IN APPARATUS FOR NAVIGATING THE AIR.

Specification forming part of Letters Patent No. 133,046, dated November 12, 1872.

*To all whom it may concern:*

Be it known that I, CHARLES MCDERMOTT, of Monticello, in the county of Drew and in the State of Arkansas, have invented certain new and useful Apparatus for Navigating the Air; and do hereby declare that the following is a full, clear, and exact description thereof, reference being had to the accompanying drawing making part of this specification, in which—

Figure 1 is a plan view of the upper side of my device; and Figs. 2 and 3 are, respectively, a front and a side elevation of the same.

Letters of like name and kind refer to like parts in each of the figures.

The object of my invention is to furnish a means whereby the air can be navigated without the employment of gas or other equivalent means for securing bouyancy; and it consists principally in a vertical series of vanes, arranged upon or within a suitable frame, and having an angle of about five degrees from a horizontal line, in combination with suitable apparatus for propelling and guiding the device, substantially as and for the purpose hereinafter specified. It consists, further, in the means employed for propelling the device, substantially as is hereinafter shown. It consists, when each of its parts is constructed and further, in the means employed for controlling the vertical course of the device, substantially as is hereinafter shown and described. It consists, finally, in the apparatus as a whole, combined, substantially as and for the purpose hereinafter specified.

In the annexed drawing, A and A represent two or more bars arranged in vertical and parallel lines, and connected together at a point slightly below their longitudinal centers by means of a horizontal bar, B. Secured to or upon each vertical bar A, immediately below the cross-bar B, is a bar, C, which extends outward to an equal distance in opposite directions and has an inclination of about five degrees from a horizontal line. From or near the outer ends of the cross-bar B a series of wires, D, extend upward and downward to points upon the outer vertical bars A, and after being firmly attached to said bars, extend horizontally across, through or around the intermediate bars A, and have their opposite ends connected to or with the opposite ends of said cross-bar. Other wires, E, pass outward from or near one end of said cross-bar and are connected to or with the bars C, and, passing through or around each bar of said series, have their opposite ends attached to or upon the opposite end of said cross-bar. The ends of the bars C are connected together by means of wires F, which extend between the same, while the vertical positions of said ends are insured by brace-wires G which, from the same, extend upward and downward to the ends of the vertical bars A. Secured to or upon the outer vertical bars A, at equidistant points, are a series of short cross-bars, H, which have the same inclination as the bars C, and are connected to or with each other by means of brace-wires I, which pass from the upper and lower ends of said vertical bars and are firmly attached to the ends of said cross-bars. The cross-bars H furnish a support for the vanes K, which are composed of suitable textile fabric and extend horizontally between the corresponding opposite bars. Pivoted at their longitudinal centers, to or between the center cross-bars C, are two strips of wood, L, which have a length equal to about two-thirds the length of the device and are suitably braced by means of wires M, which extend from the ends of the outer cross-bars C upward and downward to or near a point midway between the ends and centers of said strips L. At or near each end of the strips L are hinged two or more vanes, N, which are so arranged as to "feather" when moved forward and to occupy a position in a line with said strips when moved rearward. Upon the opposite or rear end of the cross-bars C are pivoted the ends of two bars, O, which extend rearward and are connected together by means of a brace-rod, P, which passes outward from the ends of the outer bars C to and across from the ends of said bars O. A piece of cloth, Q, is stretched horizontally across the bars O, and as the rear ends of the latter are raised or lowered the whole operates as a guide for the main frame and directs its course upward or downward. Immediately below the cross-bar or brace B, and between the center vertical bars A, is placed a board, R, upon which the operator is supported. This board or support may be rigidly secured in place, or it may be pivoted at its center so as to be capable of motion in a vertical plane and enable the operator, who lies upon his back or face, to assume the angle found most desirable. From the propeller-bars or strips L, above and below their longitudinal centers, suitable wires S pass inward and are to be connected with the feet of the operator, so that by alternately drawing up and extending his legs an oscillating movement will be given to said propeller so as to cause the pivoted vanes of the latter to "feather" or to impinge against the air as they pass forward or rearward, by which means the entire device is moved forward within and against the air, which latter, operating upon the inclined lower surfaces of the fixed vanes K, exerts an upward pressure which corresponds in degree to the inclination of said vanes and the velocity of the air. The guiding-vane is operated by means of cords or wires T which pass from or near the outer ends of each bar O upward or downward and inward to and around the end of a cross-bar, U, which is secured vertically upon said bar O near its longitudinal center. From the ends of the bar U the wires or cords pass inward to the operator, who, by pulling inward upon the upper or the lower set, can correspondingly elevate or depress the guiding-vane and change the vertical course of the machine.

The dimensions of the various portions of the device, when constructed for one operator, are as follows: The vertical bars have a length of sixteen feet; the cross-bar B, thirty-two feet; the cross-bar C, eight feet; the propeller, twelve feet long, with vanes four inches wide; the guiding-vane, three feet wide and six feet long.

The operation of this device is as follows: The operator places himself upon the support R with his face upward, his feet connected to or with the cords for actuating the propeller, and the cords of the guiding-vane in his hands, in which position he is enabled, by alternately drawing and extending outward his legs, to give a forward motion to the machine, while, by means of the guiding-vane, the course of the same is easily controlled.

Having thus fully set forth the nature and merits of my invention, what I claim as new is—

1. A series of vanes, K, arranged horizontally within a vertical frame, constructed as shown, and having each an angle, transversely, of about five degrees from a horizontal plane, in combination with propelling and guiding devices, substantially as and for the purpose specified.

2. In combination with the vertical series of inclined vanes and with their supporting-frame, the propeller shown, consisting of the pivoted bars L provided with the hinged vanes N' and operated by means of the wires S, substantially as and for the purpose shown.

3. In combination with the vertical series of inclined vanes and with their supporting-frame, the guiding-vane composed of the bars O, brace-rod P, and cloth Q, and operated by means of the wires T and cross-bars U, substantially as and for the purpose shown and described.

4. The device as a whole, consisting of the supporting-frame, vertical series of inclined vanes, propeller and guiding-vane, when said parts are constructed and combined, substantially as and for the purpose specified.

In testimony that I claim the foregoing I have hereunto set my hand this 20th day of June, 1872.

CHARLES McDERMOTT.

Witnesses:
  GEO. S. PRINDLE,
  EDM. F. BROWN.